(12) United States Patent
Feick

(10) Patent No.: US 7,824,163 B2
(45) Date of Patent: Nov. 2, 2010

(54) INJECTION MOLDING SYSTEM HAVING A BUS

(75) Inventor: Murray Feick, Kitchener (CA)

(73) Assignee: Mold-Masters (2007) Limited, Georgetown (CA)

(*) Notice: Subject to any disclaimer, the term of this patent is extended or adjusted under 35 U.S.C. 154(b) by 215 days.

(21) Appl. No.: 11/962,704

(22) Filed: Dec. 21, 2007

(65) Prior Publication Data
US 2008/0152747 A1 Jun. 26, 2008

Related U.S. Application Data

(60) Provisional application No. 60/871,672, filed on Dec. 22, 2006.

(51) Int. Cl.
*B29C 45/78* (2006.01)
(52) U.S. Cl. .................. 425/135; 425/143; 425/144
(58) Field of Classification Search .................. 425/135, 425/143, 144
See application file for complete search history.

(56) References Cited

U.S. PATENT DOCUMENTS

| | | | |
|---|---|---|---|
| 4,726,751 A | | 2/1988 | Shibata et al. |
| 4,899,288 A | | 2/1990 | Tsutsumi |
| 5,229,952 A | * | 7/1993 | Galloway et al. ........... 425/135 |
| 5,320,513 A | | 6/1994 | Schmidt |
| 5,552,998 A | | 9/1996 | Datta |
| 5,591,366 A | | 1/1997 | Schmidt |
| 5,795,511 A | | 8/1998 | Kalantzis et al. |
| 5,853,631 A | | 12/1998 | Linehan |
| 6,272,398 B1 | | 8/2001 | Osborne et al. |
| 6,529,796 B1 | | 3/2003 | Kroeger et al. |
| 6,606,251 B1 | * | 8/2003 | Kenny et al. ................. 361/764 |
| 6,670,830 B2 | * | 12/2003 | Otsuka et al. ................. 326/86 |
| 6,674,006 B1 | | 1/2004 | Linehan et al. |
| 6,813,537 B2 | | 11/2004 | Linehan et al. |
| 6,913,453 B2 | | 7/2005 | Kalantzis |
| 6,936,199 B2 | * | 8/2005 | Olaru ........................ 264/40.6 |
| 7,020,540 B2 | | 3/2006 | Linehan et al. |
| 7,066,725 B2 | | 6/2006 | Zufle |
| 7,154,300 B2 | * | 12/2006 | Anders et al. .................. 326/86 |
| 7,245,834 B2 | * | 7/2007 | Vigier-Blanc et al. ........ 398/135 |
| 7,456,778 B2 | * | 11/2008 | Werner et al. ................ 713/300 |
| 2006/0081719 A1 | | 4/2006 | Nguyen |
| 2006/0082010 A1 | | 4/2006 | Saggese et al. |

FOREIGN PATENT DOCUMENTS

| | | |
|---|---|---|
| DE | 102 24 414 B4 | 8/2003 |
| DE | 10 2004 052499 B4 | 7/2006 |
| DE | 10 2006 009 808 B3 | 7/2006 |
| DE | 10 2006 009808 B3 | 7/2007 |
| JP | 63-098007 A | 4/1998 |
| JP | 2000-263597 A | 9/2000 |
| JP | 2002-001785 A | 1/2002 |
| WO | WO-01/07229 A2 | 2/2001 |
| WO | WO-2007/092474 A1 | 8/2007 |

* cited by examiner

*Primary Examiner*—Tim Heitbrink
(74) *Attorney, Agent, or Firm*—Medler Ferro PLLC

(57) ABSTRACT

An injection molding system includes a mold having a hot half and a cold half, the hot half including a hot runner. A bus transceiver is located in the mold. At least one electrical device associated with the operation of the mold is located in the mold and electrically coupled to the bus transceiver. A controller for controlling the mold is located outside the mold. A bus line electrically couples the controller to the bus transceiver of the electrical device apparatus includes an injection manifold having an inlet and a melt channel.

30 Claims, 16 Drawing Sheets

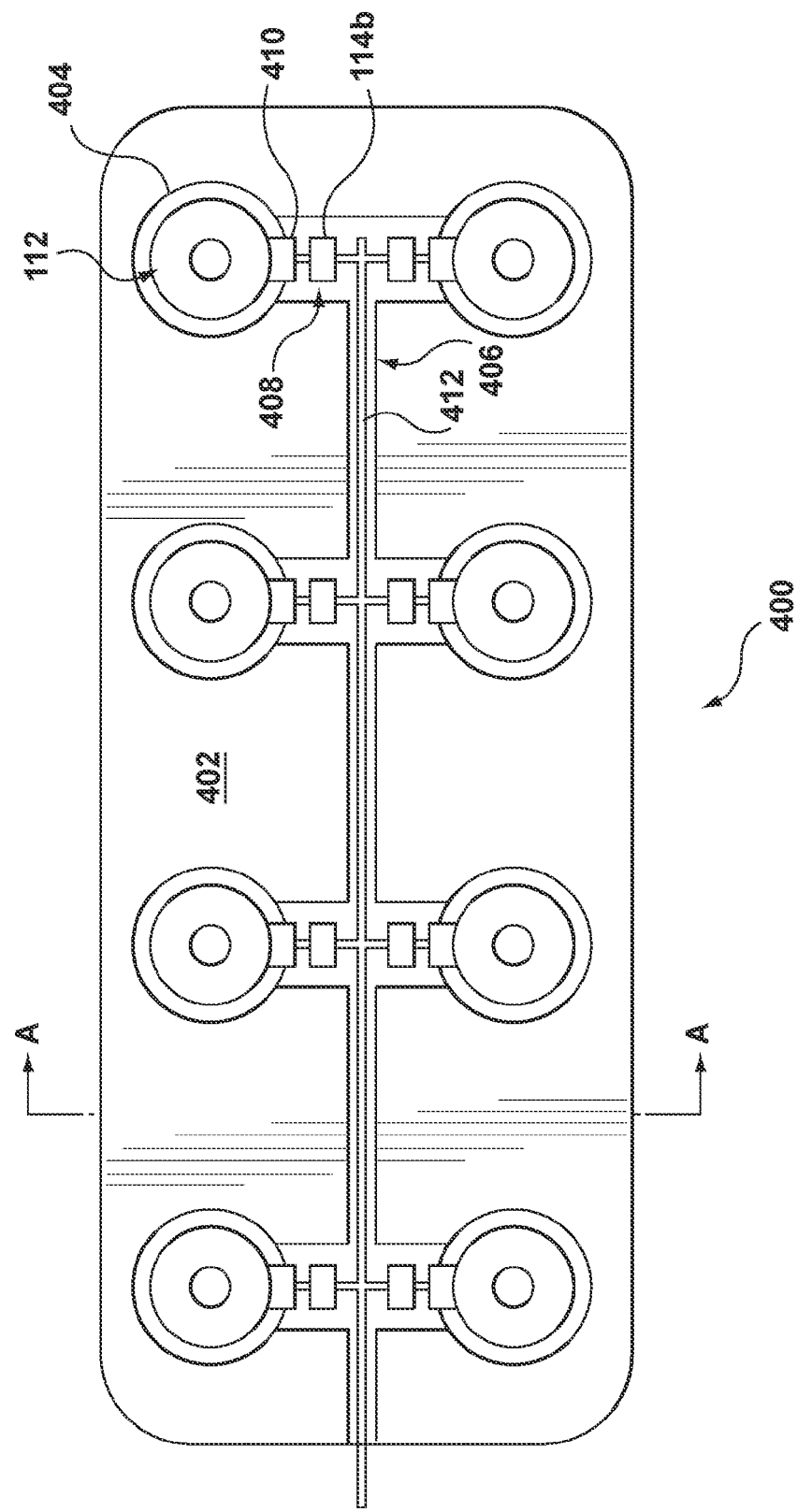

Section A-A

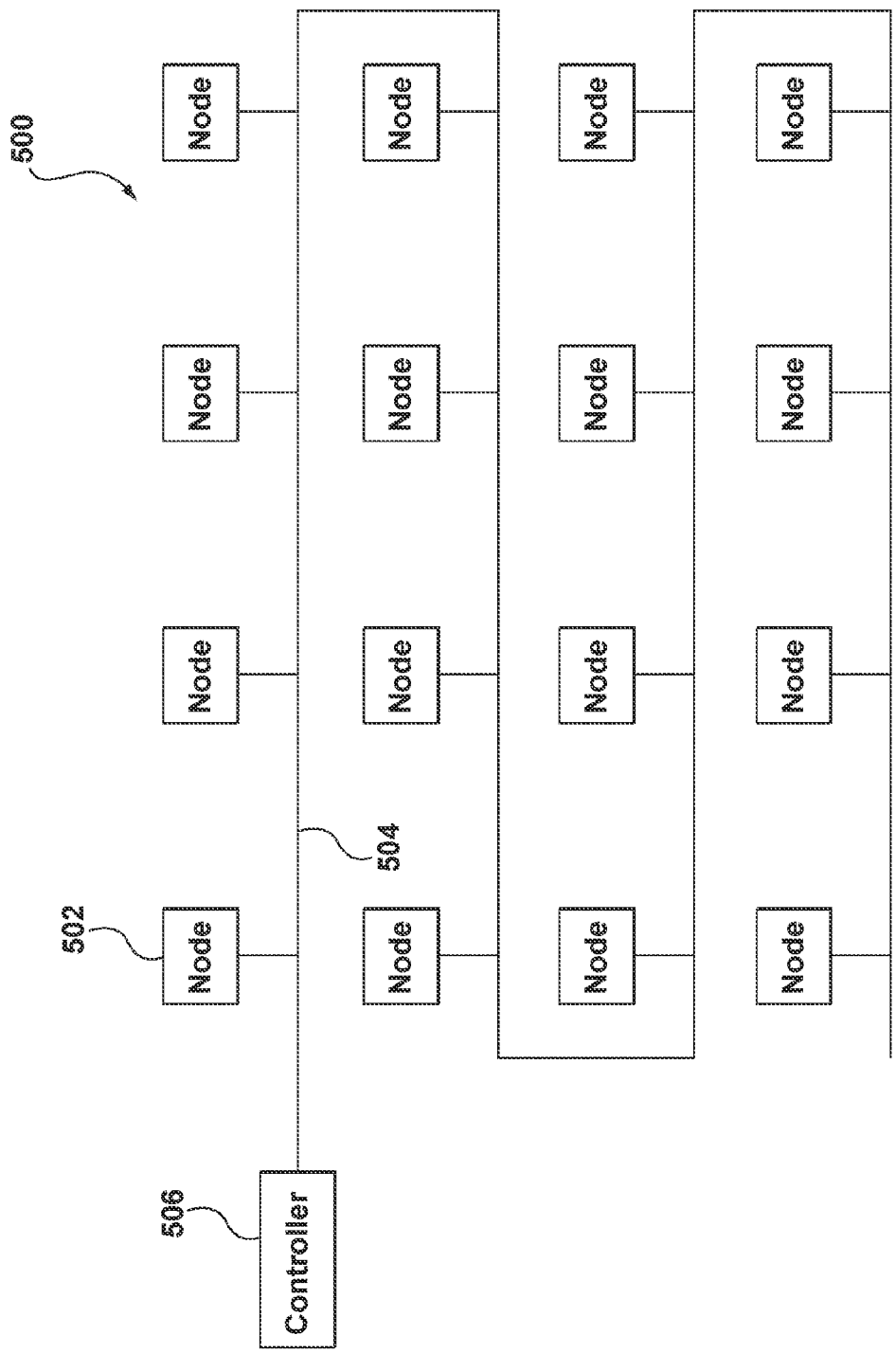

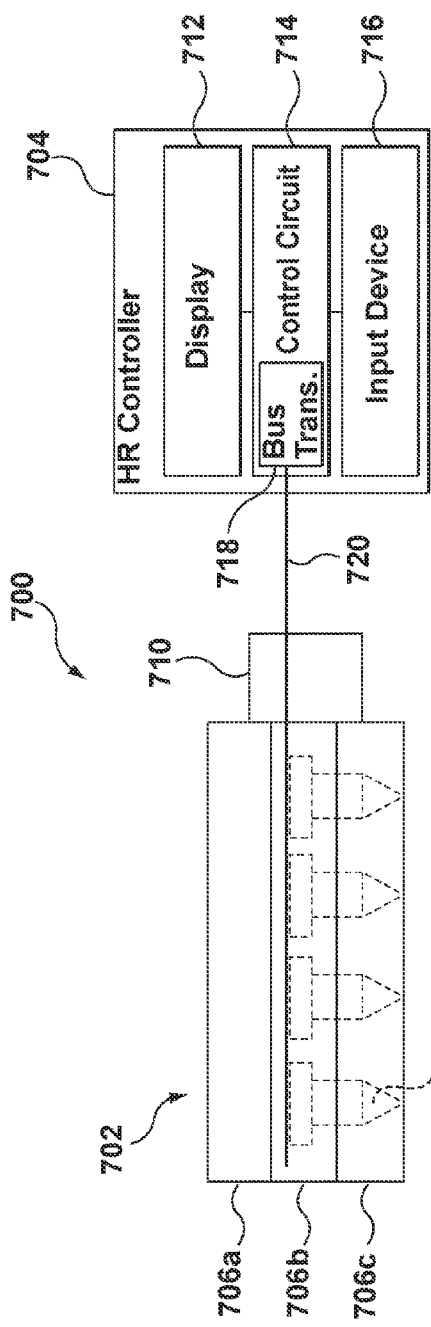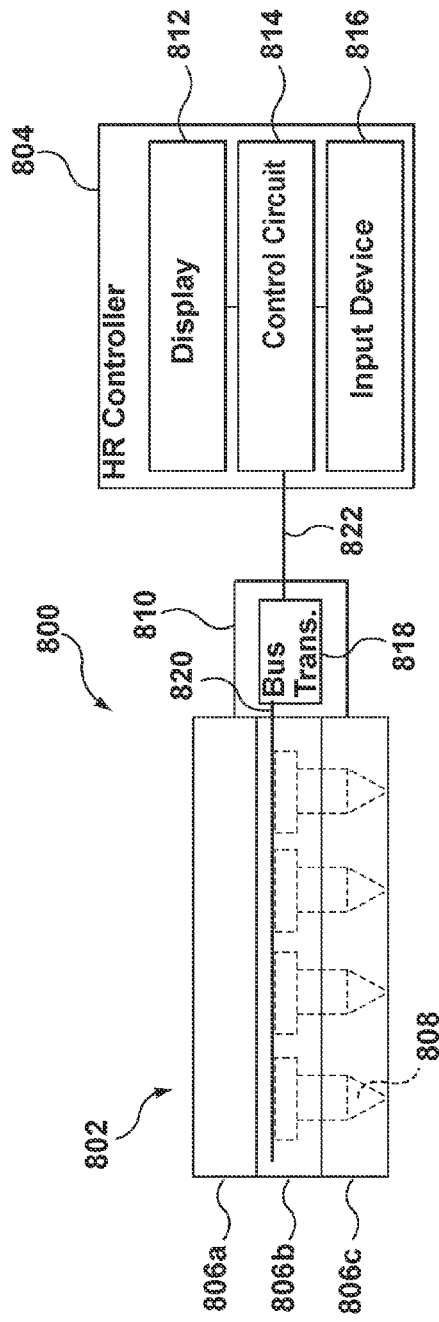

INJECTION MOLDING SYSTEM HAVING A BUS

CROSS-REFERENCE TO RELATED APPLICATIONS

This application is a non-provisional application claiming the benefit under 35 U.S.C. §119(e) of U.S. Provisional Patent Application No. 60/871,672 filed Dec. 22, 2006, which is hereby incorporated by reference in its entirety herein.

BACKGROUND OF THE INVENTION

1. Field of the Invention

The present invention relates generally to injection molding and in particular, to control of injection molding.

2. Related Art

Injection molding systems are used to make articles out of moldable material such as plastics and some metals.

Injection molding systems typically include molds, which can be defined as having a hot half and a cold half. The hot half usually has a hot runner made up of a manifold and one or more nozzles. The cold half usually has cavities. Because it is common for the mold to have sensors and actuators, such as thermocouples and heaters, a controller is usually provided.

The typical controller is a computer that runs software to control the mold. Simpler control circuits, including ones that do not use software, can also be used. The controller and the mold are usually connected by a large set of independent conductive wires.

SUMMARY OF THE INVENTION

According to one embodiment of the invention, an injection molding system includes a mold having a hot half and a cold half, the hot half including a hot runner. A bus transceiver is located in the mold. At least one electrical device associated with the operation of the mold is located in the mold and electrically coupled to the bus transceiver. A controller for controlling the mold is located outside the mold. A bus line electrically couples the controller to the bus transceiver of the electrical device.

BRIEF DESCRIPTION OF THE FIGURES

Embodiments of the present invention will now be described more fully with reference to the accompanying drawings where like reference numbers indicate similar structure.

FIG. 4a illustrates a wiring layout according to an embodiment of the invention.

FIG. 4b shows a section A-A of the mold assembly of FIG. 4a.

FIG. 5 is a schematic diagram of a bus layout according to an embodiment of the invention.

FIG. 7 is a schematic diagram of a bussed injection molding system having a hot half and controller according to an embodiment of the invention.

FIG. 8 is a schematic diagram of another embodiment of a bussed injection molding system having a hot half and controller.

DETAILED DESCRIPTION OF THE INVENTION

Figure 1:
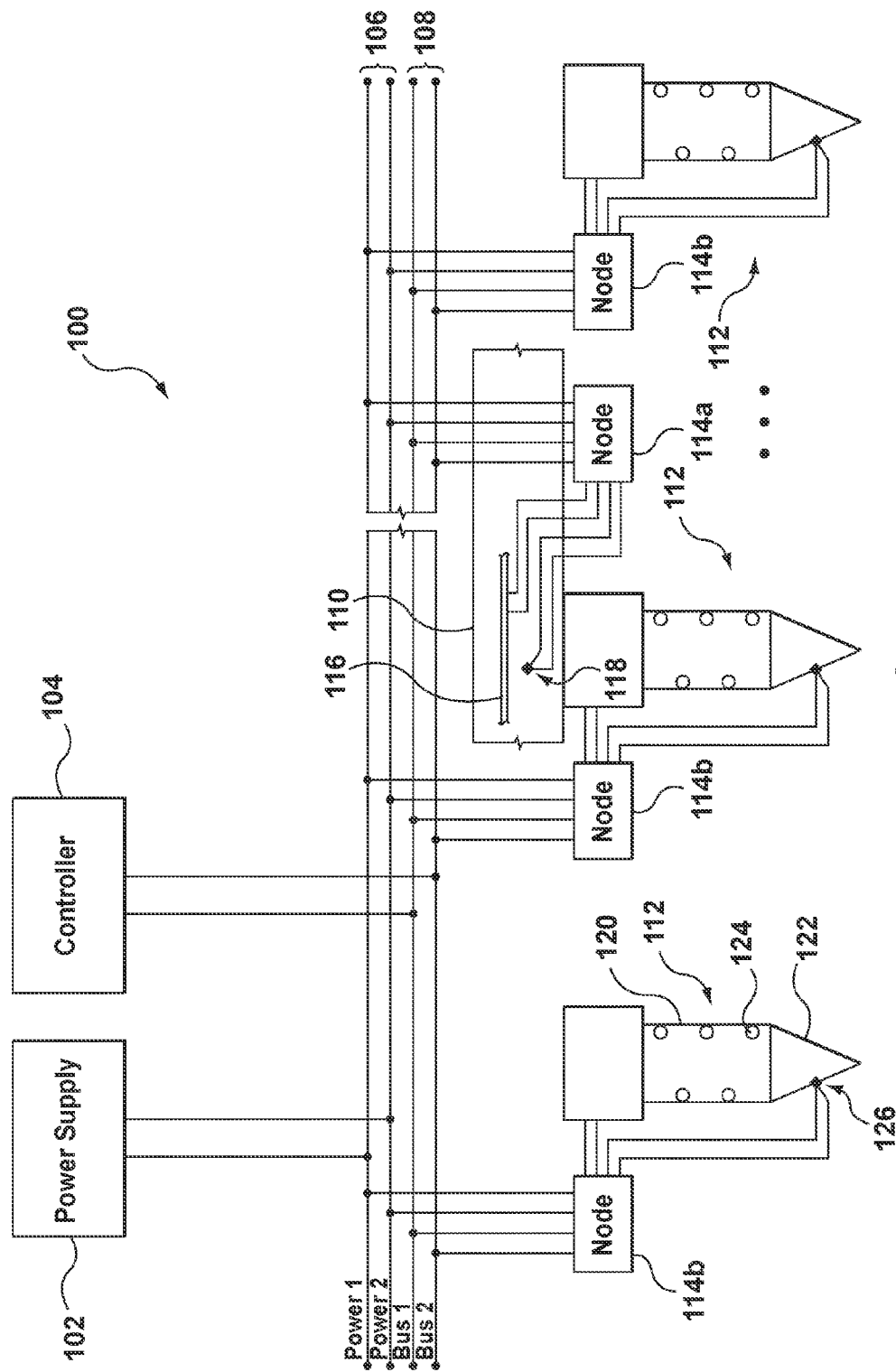
FIG. 1 is a schematic diagram of a bus connecting nozzles and a manifold to a controller according to an embodiment of the invention.

FIG. 1 shows a schematic diagram of components of an injection molding system 100 according to an embodiment of the invention. The system 100 includes a power supply 102, a controller 104, power lines 106, bus lines 108, a manifold plate 110, nozzles 112, and nodes 114. FIG. 1 is simplified to ease understanding of the invention. Not shown are an injection molding machine, hot-half and cold-half plates, actuators, melt channels, cooling channels, heaters, and other well-known features and components. The manifold plate 110 and the nozzles 112 are usually known as a hot runner or hot runner device.

The power supply 102 provides electrical power to the system 100. In this embodiment, the power supply 102 provides 220 VAC. In other embodiments, the power supply can provide other levels of AC or DC power (e.g., 24 VDC). Electrical power in the system 100 is transmitted by power lines 106 and the lines that connect the power supply 102 and nodes 114 to the power lines 106.

The controller 104 can be a computer or a processing circuit designed to control the system 100. In this embodiment, the controller 104 measures temperatures of the nozzles 112 and the manifold plate 110 and controls the heaters accordingly. Signals between the controller 104 and the nodes 114 are communicated over the bus lines 108 and the lines that connect the controller 104 and the nodes 114 to bus lines 108. The controller 104 and the power supply 102 can be part of the same device. The controller 104 will be described in more detail below.

The manifold plate 110, which is only partially shown for clarity, includes a heater 116, such as a resistance wire heater element, and a temperature sensor 118, such as a thermocouple. The heater 116 and temperature sensor 118 are connected to the node 114a. In other embodiments, the manifold plate 110 can be a modular or tubular manifold.

Each nozzle 112 includes a nozzle body 120 and a nozzle tip 122. Each nozzle 112 also includes a heater 124, such as a resistance wire heater element, and a temperature sensor 126, such as a thermocouple. The heater 124 and temperature sensor 126 are connected to the node 114b by wires.

The nodes 114a, 114b serve to communicate power from the power lines 106 to the heaters 116, 124. The nodes 114a, 114b also serve to communicate signals from the temperature sensors 118, 126 to the controller 104 via the bus lines 108. Further, the nodes 114a, 114b can receive control signals from the controller 104 via the bus lines 108. The nodes 114a, 114b will be described in more detail below.

The bus lines 108 and power lines 106 can be wires, a set of wires, or a printed circuit board having conductive traces.

By using the bus lines 108 and power lines 106, the overall wiring complexity is reduced. The nodes 114 are provided because signals on the bus lines 108 must be at least partially interpreted to determine to which device they apply. For this purpose and others, the nodes 114 have logic that can monitor the bus lines 108, take information off the bus lines 108, and put information onto the bus lines 108.

Figure 2:
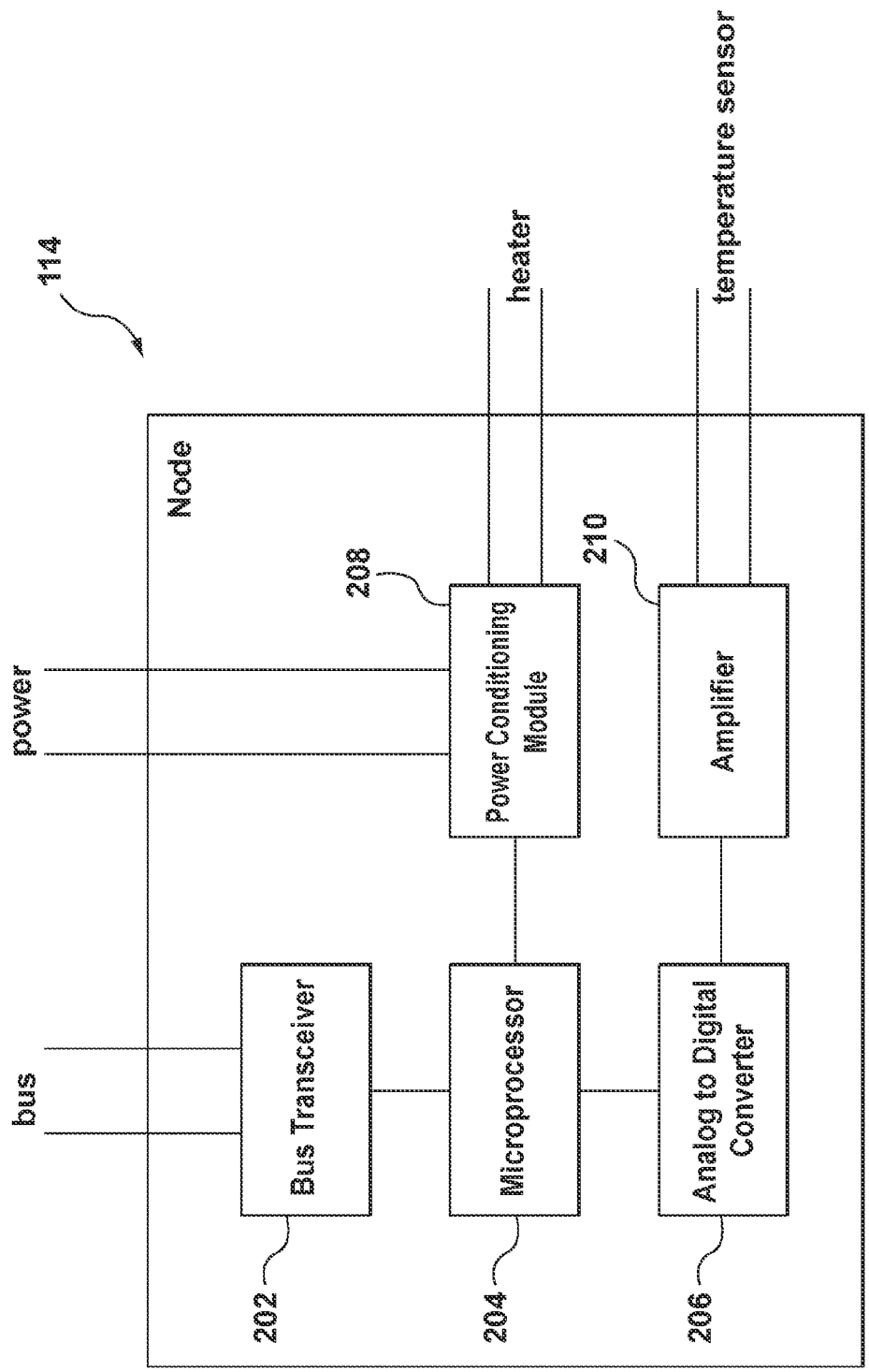
FIG. 2 is a block diagram of a node according to an embodiment of the invention.

FIG. 2 illustrates a block diagram of a node according to one embodiment of the invention. The node 114 includes a bus transceiver 202, a microprocessor 204, an analog-to-digital converter 206, a power conditioning module 208, and an amplifier 210.

The bus transceiver 202 is coupled to the bus lines 108 allowing it to communicate over these lines. The bus transceiver 202 can monitor the bus lines 108, take information off the bus lines 108, and put information onto the bus lines 108. The bus transceiver 202 is also connected to the microprocessor 204, and communicates with the microprocessor 204. A primary function of the bus transceiver 202 is to manage transmission of data between the microprocessor 204 and the bus lines 108.

The microprocessor 204 is the central component of the node 114. The microprocessor 204 is connected to the bus transceiver 202, the analog-to-digital converter 206, and the power conditioning module 208. The microprocessor 204 executes instructions and manages communication of data between the bus transceiver 202, the analog-to-digital converter 206, and the power conditioning module 208.

The analog-to-digital converter 206 is connected between the microprocessor 204 and the amplifier 210. The analog-to-digital converter 206 converts analog signals received from the amplifier 210 into digital signals suitable for the microprocessor 204. If the temperature sensor 118 or 126 (see FIG. 1) outputs a digital signal, the analog-to-digital converter 206 may be omitted.

The power conditioning module 208 is coupled to the power lines 106 and connected between the microprocessor 204 and the heater (e.g., nozzle heater 124 or manifold heater 116). The power conditioning module 208 receives data from the microprocessor 204 and supplies power to the heater based on the received data. In this embodiment, the maximum power that power conditioning module 208 module can supply to the heater would be the power on the lines 106, while the minimum is none.

The amplifier 210 is connected between the analog-to-digital converter 206 and the temperature sensor (e.g., manifold sensor 118 or nozzle sensor 126). The amplifier 210 serves to amplify signals received from the temperature sensor. The amplifier 210 can be omitted if the sensor output is expected to be sufficient.

In this embodiment, operation of the node 114 is as follows. Output from the temperature sensor is amplified by the amplifier 210. The amplified signal is converted into a digital signal by the analog-to-digital converter 206, which outputs the digital signal to the microprocessor 204. The microprocessor 204 performs any required processing, organization, or collocation of the data. The bus transceiver 202 then manipulates the data output from the microprocessor 204 into a form suitable for transmission over the bus lines 108, e.g., a data packet, which may mean that the bus transceiver 202 waits for more temperature data to assemble an economical packet. The microprocessor 204 then forwards the packetized data to the bus transceiver 202, which puts the data onto the bus lines 108 as differential (balanced) signals. Later, the bus transceiver 202 reads data put on the bus lines 108 by the controller 104, and forwards this data to the microprocessor 204. The microprocessor digests the data and, if appropriate, sends a signal to the power conditioning module 208, which, in response, increases, decreases, or maintains the power transferred from the power lines 106 to the heater. In this way, the nodes 114 can realize temperature sensor data collection and heater control over the common bus lines 108.

Many kinds of bus schemes are suitable for use in the invention. The controller 104 can be the master of the bus lines 108, and thereby control access of the nodes 114 to the bus lines 108. Or, equally, arbitration for the bus lines can be used, wherein the nodes 114 and the controller 104 negotiate for control of the bus lines 108. In such a system, it is usual for the controller to simply contain a bus transceiver much like those of the nodes, and in a sense the controller is on an equal footing with the nodes (though it may have a higher priority). This kind of system is sometimes known as a multi-master bus system having priority arbitration, an example of this being the controller area network (CAN) bus system developed by BOSCH. Data from the controller 104 can be intended for one, many, or all of the nodes 114, as indicated in an identifier field of the data packet. In the above embodiment, negotiation for the bus lines can be managed by the bus transceiver 202, the microprocessor 204, or a combination of both. In addition, many kinds of bus line arrangements and quantities and many kinds of bus transceivers and signal schemes are suitable for use in the invention.

The components described above are standard. In addition, the components can be amalgamated or reduced to more discrete components. For example, the bus transceiver 202 and the microprocessor 204 can be disposed on the same integrated circuit (chip). In another example, all the components of the node 114 can be implemented on a single integrated circuit.

In FIG. 2, for ease of understanding the invention, omitted were internal operating power and ground lines and connections, and supplementary components, such as filters, buffers, signal processors, and regulators. In many embodiments, these supplementary components can be integral to the main components described above. Error checking or correction functionality and hardware was also omitted from the above, but this is well known in the art.

Figure 3:
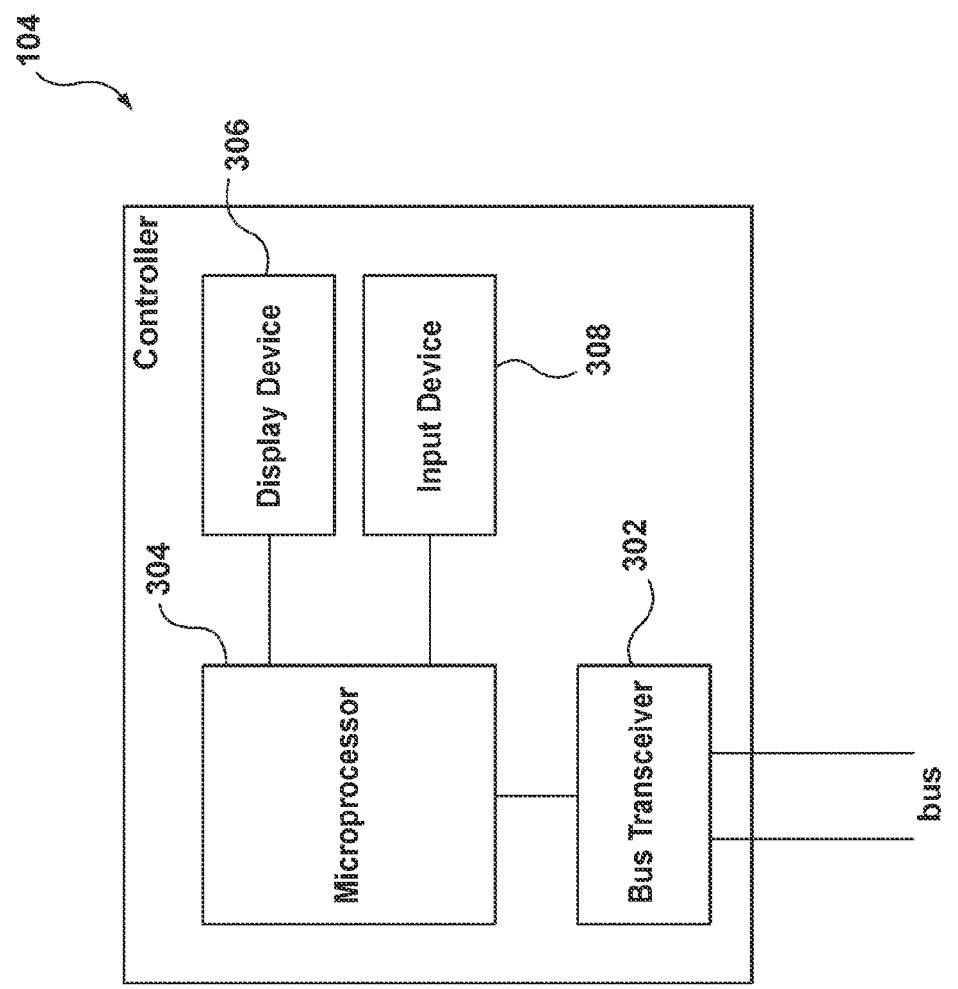
FIG. 3 is a block diagram of a controller according to an embodiment of the invention.

FIG. 3 illustrates a block diagram of a controller 104 according to one embodiment of the invention. The controller 104 includes a bus transceiver 302, a microprocessor 304, a display device 306, and an input device 308. Aside from the bus transceiver 302 and the related programming of the microprocessor 304, the controller 104 is generally known in the art.

The bus transceiver 302 is coupled to the bus lines 108 allowing it to communicate over these lines. The bus transceiver can monitor the bus lines 108, take information off the bus lines 108, and put information onto the bus lines 108. The bus transceiver is also connected to the microprocessor 304, and communicates with the microprocessor 304. A primary function of the bus transceiver 302 is to manage transmission of data between the microprocessor 304 and the bus lines 108. The bus transceiver 302 can be identical to the bus transceivers 202 of the nodes 114.

The microprocessor 304 is the central component of the controller 104. The microprocessor 304 is connected to the bus transceiver 302, display device 306, and the input device 308. The microprocessor 304 executes instructions and manages communication of data between the bus transceiver 302, display device 306, and the input device 308. One function of the microprocessor 304 is to perform calculations on sensor measurements from the bus. In this embodiment, the microprocessor 304 is programmed to calculate power for a heater based on a corresponding temperature measurement and a related operator input. For example, if an operator sets a nozzle temperature to 190 degrees C. and the microprocessor 304 receives from the bus a temperature measurement for that nozzle of 180 degrees C., the microprocessor 304 generates an instruction for the node 114b of that nozzle to increase the heater power by 80 watts. Such instruction is sent to the microprocessor 204 of the node 114b by way of the bus. The microprocessor 304 can range in complexity from a computer to a simple control circuit.

The display device 306 is a monitor in this embodiment, although other devices can also be used. The display device 306 shows to the operator information regarding the operation of the molding system 100. Such information can include nozzle and manifold temperatures and power levels.

In this embodiment, the input device 308 is a keyboard, although other devices can also be used. The operator can use the keyboard 308 to input control instructions to the microprocessor 304. Such control instructions can include set temperatures, set power levels, and maximum and minimum power levels.

FIG. 4a illustrates a wiring layout according to an embodiment of the invention. A mold assembly 400 includes a mold plate 402 having a plurality of openings 404 for accommodating the nozzles 112, a main electrical conduit 406, and a branch electrical conduit 408 for each nozzle 112. In assembly, a manifold would be placed on top of the mold plate 402. The electrical conduits 406, 408 are open conduits machined in the mold plate 402. The nodes 114b are located within the branch conduits 408 and are connected to the nozzles through terminal ends 410 of the nozzles 112. Wires 412 connect the nodes 114b to outside the mold plate 402. The wires 412 include bus lines (such as lines 108 of FIG. 1) and power lines (such as lines 106 of FIG. 1). Since a bus is used, the width of the main electrical conduit 406 can be constant. That is, as each branch electrical conduit 408 joins the main electrical conduit 406, the electrical conduit need not be widened to accommodate more and more wires, as is necessary in the prior art.

Figure 4B:
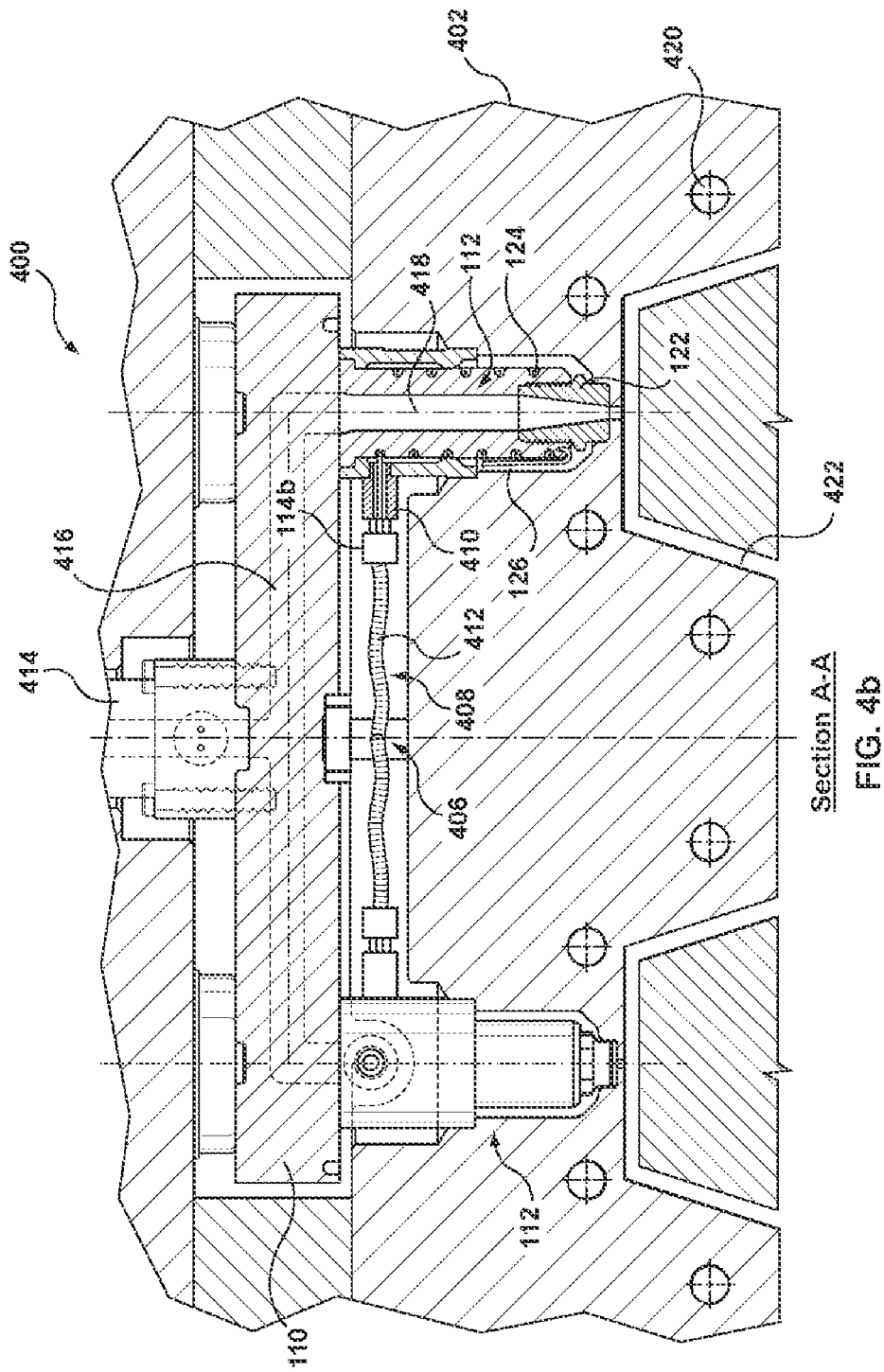

FIG. 4b shows a section A-A of the mold assembly 400 of FIG. 4a. Along with the manifold 110 of FIG. 1, further components are shown in FIG. 4b, such as a sprue 414, a manifold melt channel 416, a nozzle melt channel 418, cooling channels 420 of the mold plate 402, and cavities 422.

FIG. 5 illustrates a schematic diagram of a bus layout 500 according to an embodiment of the invention. The bus layout 500 is one way to physically implement the buses described herein. Nodes 502 are connected to a zigzagging bus line 504, which can include power lines as well. One end of the bus line 504 is connected to a controller 506, although the controller 506 could equally be connected elsewhere on the bus line 504. In the bus layout 500, any number of nodes 502 can be arranged to serve any number of mold components, such as nozzles and manifolds. The shape of the bus layout 500 need not be grid-like as shown; any geometric arrangement of nodes 502 is possible, with the layout 500 mainly illustrating the connection relationship of the nodes 502 and bus line 504.

Figure 6:
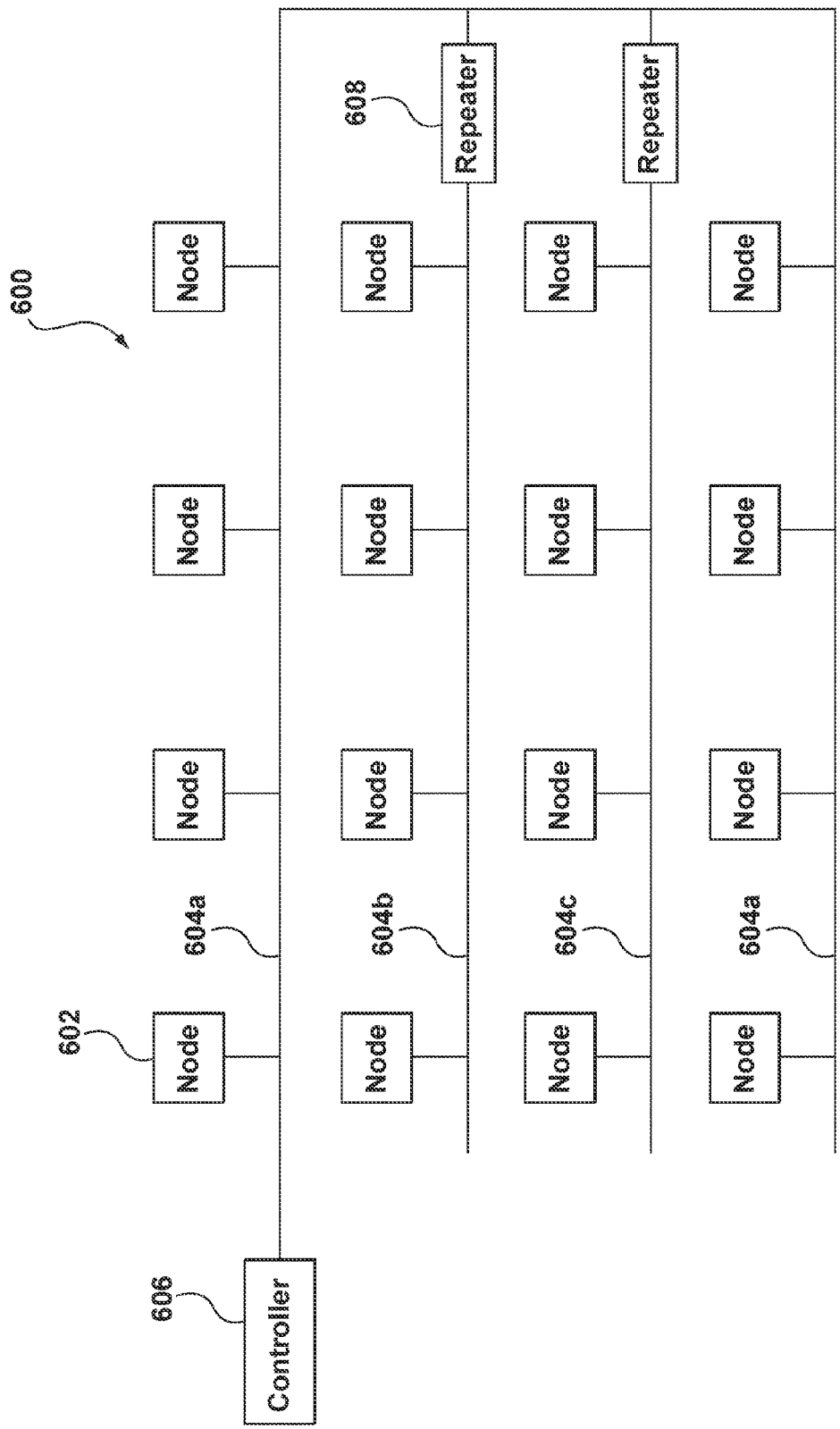
FIG. 6 is a schematic diagram of another bus layout according to an embodiment of the invention.

FIG. 6 illustrates a schematic diagram of a bus layout 600 according to another embodiment of the invention. The bus layout 600 is another way to physically implement the buses described herein. Nodes 602 are connected to several bus lines 604a-c. Bus line 604a is connected to a controller 606. Bus lines 604b and 604c are connected to bus line 604a by repeaters 608, which allow for proper signaling over the bus layout 600. As can be seen, the arrangements of nodes 602 can be similar to those of bus layout 500; however, the use of repeaters can increase the amount of layout possibilities for a bus.

FIG. 7 shows a schematic diagram of a bussed injection molding system 700 having a hot half 702 and a controller 704 according to an embodiment of the invention. A cold half and molding machine are not shown. The hot half 702 includes plates 706a-c, a manifold (not shown), and nozzles 708. Nodes (not shown) are provided for the nozzles and manifold (see FIG. 1, for example). Attached to the outside of the hot half 702 is a junction box 710. The controller 704 includes a display 712, a control circuit 714, and an input device 716. The control circuit 714 includes a bus transceiver circuit 718 and connected lines 720 that run out of the controller 704 through the junction box 710 of the hot half 702 and connect to the nodes inside the hot half 702. The bus transceiver circuit 718 is for managing the signals between the lines 720 and the control circuit 714, and in this respect can be similar to the bus transceiver 302 of FIG. 3. The lines 720 include bus lines and can include power lines as well. Connectors (not shown) are provided to the lines 720 within the junction box 710 to allow separation of the hot half 702 and the controller 704. As can be seen, the bus lines included in the lines 720 can reduce the amount of wire used from controller 704 to the nodes.

FIG. 8 shows a schematic diagram of another embodiment of a bussed injection molding system 800 having a hot half 802 and a controller 804. A cold half and molding machine are not shown. The hot half 802 includes plates 806a-c, a manifold (not shown), and nozzles 808. Nodes (not shown) are provided for the nozzles and manifold (see FIG. 1, for example). Attached to the outside of the hot half 802 is a junction box 810. The controller 804 includes a display 812, a control circuit 814, and an input device 816. The junction box 810 contains a bus transceiver card 818 and connectors (not shown) for separating the wires of lines 820 that extend into the hot half 802 and the wires of lines 822 that extend to the control circuit 814 of the controller 804. The bus transceiver card 818 includes a bus transceiver circuit for managing the signals between the lines 820 and the greater number of lines 822, and further includes connectors for physically connecting to these lines 820, 822. The lines 820 include bus lines and can include power lines as well. The lines 822 are not bussed and are provided as is conventional. As can be seen, the bus lines included in the lines 820 can reduce the amount of wire used from junction box 810 to the nodes. The amount of wire used in the system 800 is more than used in the system 700, but still less than used in the conventional system. In addition, because the bus lines begin at the junction box 820, the controller 804 and lines 822 can be off-the-shelf components requiring little or no modification.

Figure 9:
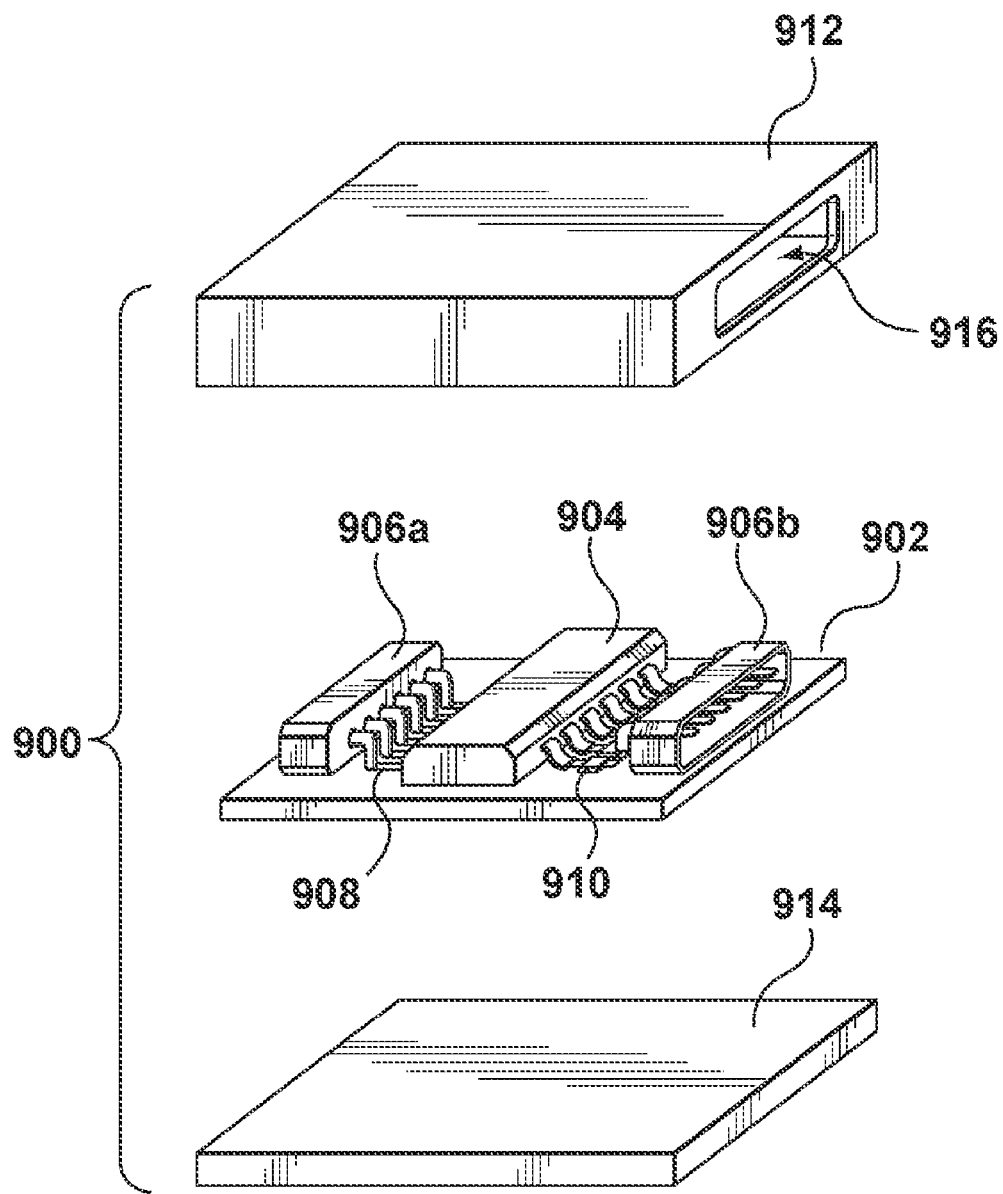
FIG. 9 is an exploded perspective diagram of a physical embodiment of a node according to an embodiment of the present invention.

FIG. 9 shows a physical embodiment of a node 900 according to an embodiment of the present invention. The 900 node includes a circuit board 902 on which is disposed an integrated-circuit (IC) chip 904 and two connectors 906a, 906b. The connector 906a is for the nozzle or manifold side and the connector 906b is for the bus/power side. The chip 904 includes all circuits needed for the node (see FIG. 2, for example) and is connected to the connectors 906a, 906b by way of conductive traces 908. Additional components, such as a resistor 910, can be provided as required. The circuit board is enclosed in a housing made up of housing top half 912 and housing bottom half 914 that are snapped, screwed, or otherwise fit together. Housing top half 912 includes openings 916 (one shown) allowing connectors 906a, 906b to be connected to mating external connectors (not shown). The housing can also be monolithic if desired. When the node 900 is to be located in a hot area of a mold, the housing is preferably made of a thermally robust material, such as high-temperature polymer or ceramic.

Figure 10:
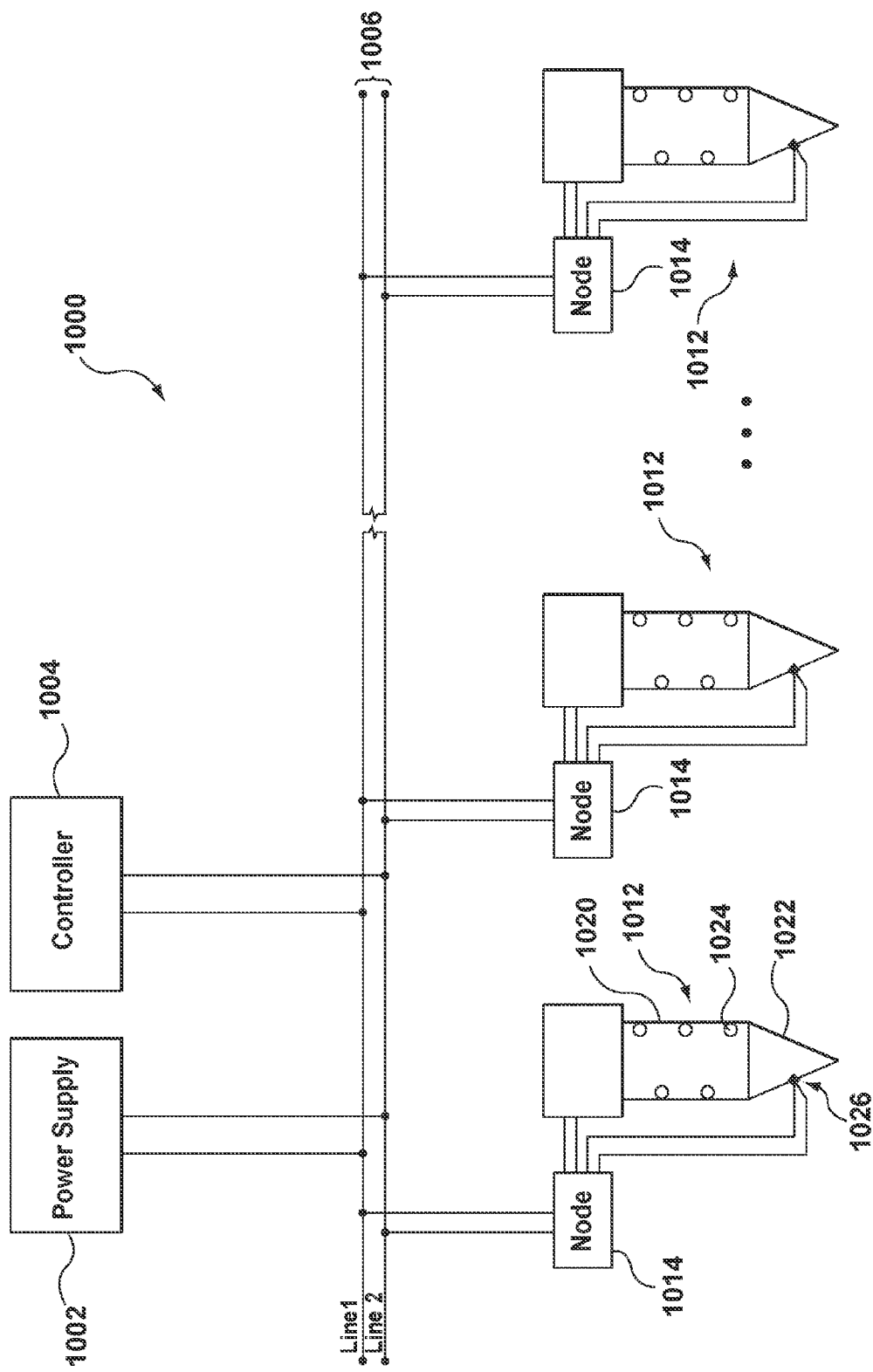
FIG. 10 is a schematic diagram of a power line bus connecting nozzles to a controller and power supply according to another embodiment of the invention.

FIG. 10 shows a schematic diagram of components of an injection molding system 1000 according to another embodiment of the invention. The system 1000 includes a power supply 1002, a controller 1004, power lines 1006, nozzles 1012, and nodes 1014. FIG. 10 is simplified to ease understanding of the invention. Not shown are an injection molding machine, hot-half and cold-half plates, a manifold, actuators, melt channels, cooling channels, heaters, and other well-known features and components. The manifold and the nozzles 1012 are usually known as a hot runner or hot runner device.

The power supply 1002 provides electrical power to the system 1000. In this embodiment, the power supply 1002 provides 220 VAC. In other embodiments, the power supply can provide other levels of AC or DC power (e.g., 24 VDC). Electrical power in the system 1000 is transmitted by power lines 1006 and the lines that connect the power supply 1002 and nodes 1014 to the power lines 1006.

The controller 1004 can be a computer or a processing circuit designed to control the system 1000. In this embodiment, the controller 1004 measures temperatures of the nozzles 1012 and controls the heaters accordingly. Signals between the controller 1004 and the nodes 1014 are communicated over the power lines 1006 and the lines that connect the controller 1004 and the nodes 1014 to the power lines 1006. The controller 1004 and the power supply 1002 can be part of the same device. The controller 1004 can be similar to that shown in FIG. 3.

As mentioned, signals between the controller 1004 and the nodes 1014 are communicated over the power lines 1006 at the same time power is transmitted over the power lines 1006. This is well known as power line communication, and so will not be described in detail. Any additional components that may be required for power line communication are well known. In this way, the power lines 1006 act as a bus.

Each nozzle 1012 includes a nozzle body 1020 and a nozzle tip 1022. Each nozzle 1012 also includes a heater 1024, such as a resistance wire heater element, and a temperature sensor 1026, such as a thermocouple. The heater 1024 and temperature sensor 1026 are connected to the node 1014 by wires.

The nodes 1014 serve to communicate power from the power lines 1006 to the heaters 1024. The nodes 1014 also serve to communicate signals from the temperature sensors 1026 to the controller 1004 via the power lines 1006. Further, the nodes 1014 can receive control signals from the controller 1004 via the power lines 1006. The nodes 1014 are similar to the node shown in FIG. 2, one difference being that the bus and power inputs would be common.

The power lines 1006 can be wires, a set of wires, or a printed circuit board having conductive traces.

By using the power lines 1006 for both power and bussed signals, the overall wiring complexity is reduced. The nodes 1014 are provided because signals on the power lines 1006 must be at least partially interpreted to determine to which device they apply. For this purpose and others, the nodes 1014 have logic that can monitor the power lines 1006, take information off the power lines 1006, and put information onto the power lines 1006.

Figure 11:
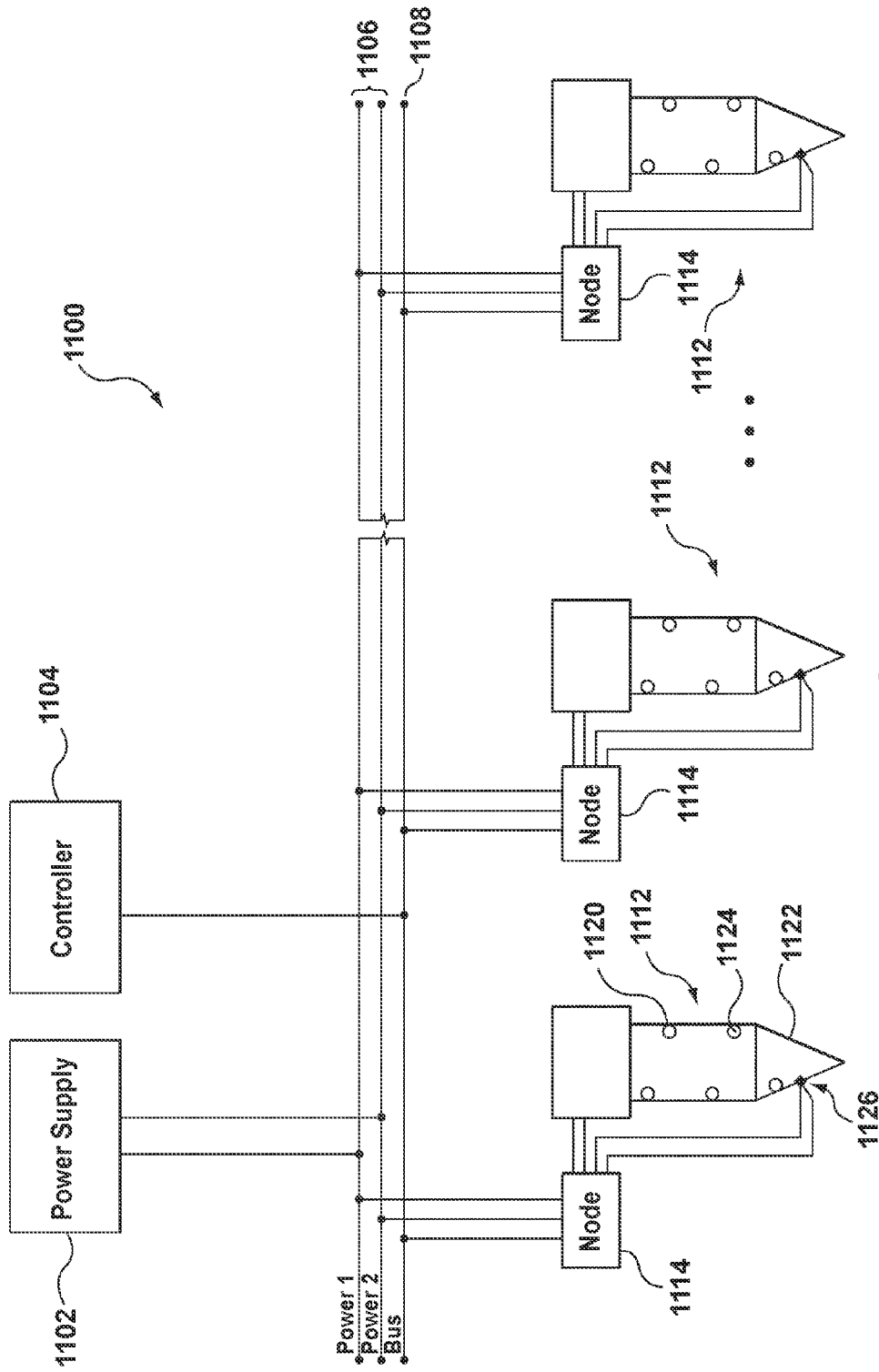
FIG. 11 is a schematic diagram of a single line bus connecting nozzles to a controller according to another embodiment of the invention.

FIG. 11 shows a schematic diagram of components of an injection molding system 1100 according to another embodiment of the invention. The system 1100 includes a power supply 1102, a controller 1104, power lines 1106, a single bus line 1108, nozzles 1112, and nodes 1114. FIG. 11 is simplified to ease understanding of the invention. Not shown are an injection molding machine, hot-half and cold-half plates, a manifold, actuators, melt channels, cooling channels, heaters, and other well-known features and components. The manifold and the nozzles 1112 are usually known as a hot runner or hot runner device.

The power supply 1102 provides electrical power to the system 1100. In this embodiment, the power supply 1102 provides 220 VAC. In other embodiments, the power supply can provide other levels of AC or DC power (e.g., 24 VDC). Electrical power in the system 1100 is transmitted by power lines 1106 and the lines that connect the power supply 1102 and nodes 1114 to the power lines 1106.

The controller 1104 can be a computer or a processing circuit designed to control the system 1100. In this embodiment, the controller 1104 measures temperatures of the nozzles 1112 and controls the heaters accordingly. Signals between the controller 1104 and the nodes 1114 are communicated over the bus line 1108 and the lines that connect the controller 1104 and the nodes 1114 to bus line 1108. The controller 1104 and the power supply 1102 can be part of the same device. The controller 1104 can be similar to that shown in FIG. 3.

Each nozzle 1112 includes a nozzle body 1120 and a nozzle tip 1122. Each nozzle 1112 also includes a heater 1124, such as a resistance wire heater element, and a temperature sensor 1126, such as a thermocouple. The heater 1124 and temperature sensor 1126 are connected to the node 1114 by wires.

The nodes 1114 serve to communicate power from the power lines 1106 to the heaters 1124. The nodes 1114 also serve to communicate signals from the temperature sensors 1126 to the controller 1104 via the bus line 1108. Further, the nodes 1114 can receive control signals from the controller 1104 via the bus line 1108. The nodes 1114 are similar to the node shown in FIG. 2.

The bus line 1108 and power lines 1106 can be wires, a set of wires, or a printed circuit board having conductive traces.

By using the single bus line 1108 and power lines 1106, the overall wiring complexity is reduced. The nodes 1114 are provided because signals on the bus line 1108 must be at least partially interpreted to determine to which device they apply. For this purpose and others, the nodes 1114 have logic that can monitor the bus line 1108, take information off the bus line 1108, and put information onto the bus line 1108.

Figure 12:
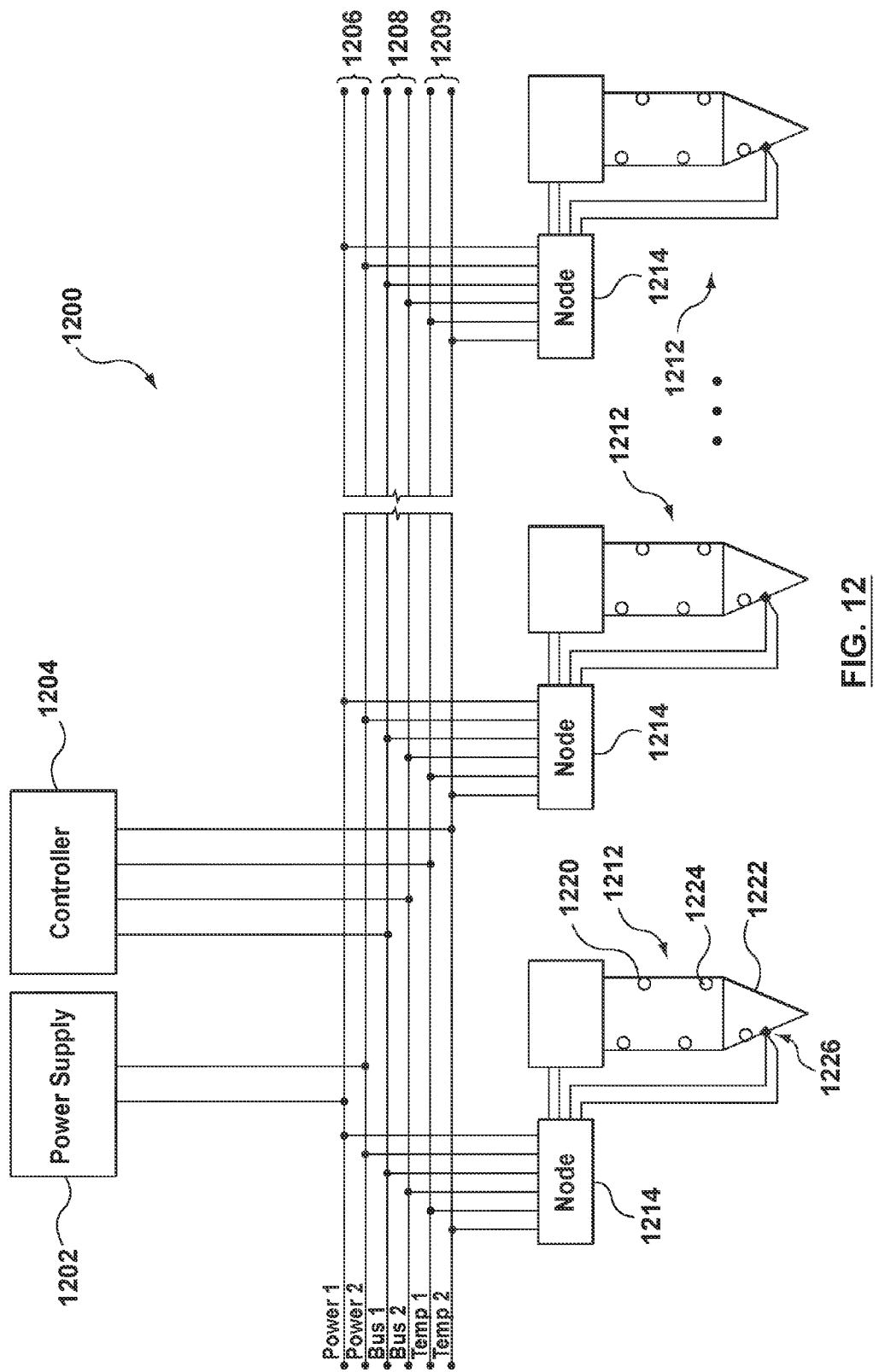
FIG. 12 is a schematic diagram of a bus lines and temperature sensor lines connecting nozzles to a controller according to another embodiment of the invention.

FIG. 12 shows a schematic diagram of components of an injection molding system 1200 according to another embodiment of the invention. The system 1200 includes a power supply 1202, a controller 1204, power lines 1206, bus lines 1208, temperature sensor lines 1209, nozzles 1212, and nodes 1214. FIG. 12 is simplified to ease understanding of the invention. Not shown are an injection molding machine, hot-half and cold-half plates, a manifold, actuators, melt channels, cooling channels, heaters, and other well-known features and components. The manifold and the nozzles 1212 are usually known as a hot runner or hot runner device.

The power supply 1202 provides electrical power to the system 1200. In this embodiment, the power supply 1202 provides 220 VAC. In other embodiments, the power supply can provide other levels of AC or DC power (e.g., 24 VDC). Electrical power in the system 1200 is transmitted by power lines 1206 and the lines that connect the power supply 1202 and nodes 1214 to the power lines 1206.

The controller 1204 can be a computer or a processing circuit designed to control the system 1200. In this embodiment, the controller 1204 measures temperatures of the nozzles 1212 and controls the heaters accordingly. Control signals between the controller 1204 and the nodes 1214 are communicated over the bus lines 1208. Temperature signals from the nodes 1214 to the controller 1204 are communicated over the temperature sensor lines 1209. The controller 1204 and the power supply 1202 can be part of the same device. The controller 1204 can be similar to that shown in FIG. 3, except that temperature sensor input would be to the microprocessor.

Each nozzle 1212 includes a nozzle body 1220 and a nozzle tip 1222. Each nozzle 1212 also includes a heater 1224, such as a resistance wire heater element, and a temperature sensor 1226, such as a thermocouple. The heater 1224 and temperature sensor 1226 are connected to the node 1214 by wires.

The nodes 1214 serve to communicate power from the power lines 1206 to the heaters 1224. The nodes 1214 also serve to forward signals from the temperature sensors 1226 to the controller 1204 via the temperature sensor lines 1209. Alternatively, the wires from temperature sensors 1226 can bypass the nodes 1214 altogether, connecting directly to the temperature sensor lines 1209. Further, the nodes 1214 can receive control signals from the controller 1204 via the bus lines 1208. The nodes 1214 are similar to the node shown in FIG. 2.

The bus lines 1208, power lines 1206, and temperature sensor lines 1209 can be wires, a set of wires, or a printed circuit board having conductive traces.

By using the bus lines 1208 and power lines 1206, the overall wiring complexity is reduced, despite the separate temperature sensor lines 1209. The nodes 1214 are provided because signals on the bus lines 1208 must be at least partially interpreted to determine to which device they apply. For this purpose and others, the nodes 1214 have logic that can monitor the bus lines 1208 and take information from the bus lines 1208.

Figure 13A:
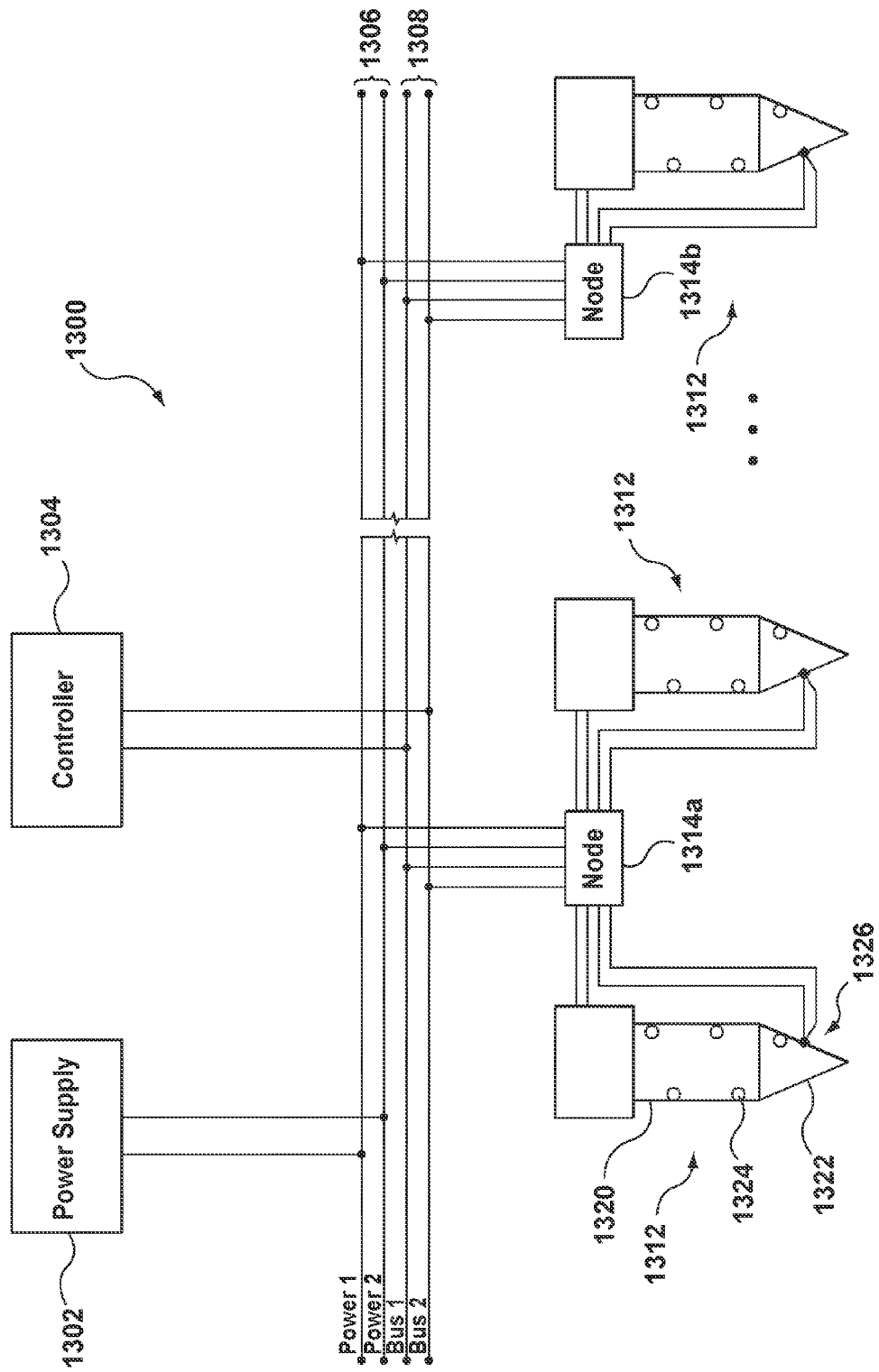
FIG. 13a is a schematic diagram of a single node connecting multiple nozzles to a controller according to another embodiment of the invention.

FIG. 13a shows a schematic diagram of components of an injection molding system 1300 according to another embodiment of the invention. The system 1300 includes a power supply 1302, a controller 1304, power lines 1306, bus lines 1308, nozzles 1312, and nodes 1314. FIG. 13a is simplified to ease understanding of the invention. Not shown are an injection molding machine, hot-half and cold-half plates, a manifold, actuators, melt channels, cooling channels, heaters, and other well-known features and components. The manifold and the nozzles 1312 are usually known as a hot runner or hot runner device.

The power supply 1302 provides electrical power to the system 1300. In this embodiment, the power supply 1302 provides 220 VAC. In other embodiments, the power supply can provide other levels of AC or DC power (e.g., 24 VDC). Electrical power in the system 1300 is transmitted by power lines 1306 and the lines that connect the power supply 1302 and nodes 1314 to the power lines 1306.

The controller 1304 can be a computer or a processing circuit designed to control the system 1300. In this embodiment, the controller 1304 measures temperatures of the nozzles 1312 and controls the heaters accordingly. Signals between the controller 1304 and the nodes 1314 are communicated over the bus lines 1308 and the lines that connect the controller 1304 and the nodes 1314 to bus lines 1308. The controller 1304 and the power supply 1302 can be part of the same device. The controller 1304 can be similar to that shown in FIG. 3.

Each nozzle 1312 includes a nozzle body 1320 and a nozzle tip 1322. Each nozzle 1312 also includes a heater 1324, such as a resistance wire heater element, and a temperature sensor 1326, such as a thermocouple. The heater 1324 and temperature sensor 1326 are connected to the node 1314 by wires.

The nodes 1314a, 1314b serve to communicate power from the power lines 1306 to the heaters 1324. The nodes 1314a, 1314b also serve to communicate signals from the temperature sensors 1326 to the controller 1304 via the bus lines 1308. Further, the nodes 1314a, 1314b can receive control signals from the controller 1304 via the bus lines 1308. The node 1314a connects to two nozzles 1312, which reduces the total number of nodes in the system 1300. The node 1314b is identical to the node shown in FIG. 2, and the node 1314a is similar and will be discussed below.

The bus lines 1308 and power lines 1306 can be wires, a set of wires, or a printed circuit board having conductive traces.

By using the bus lines 1308 and power lines 1306, the overall wiring complexity is reduced. The nodes 1314 are provided because signals on the bus lines 1308 must be at least partially interpreted to determine to which device they apply. For this purpose and others, the nodes 1314 have logic that can monitor the bus lines 1308, take information off the bus lines 1308, and put information onto the bus lines 1308.

Figure 13B:
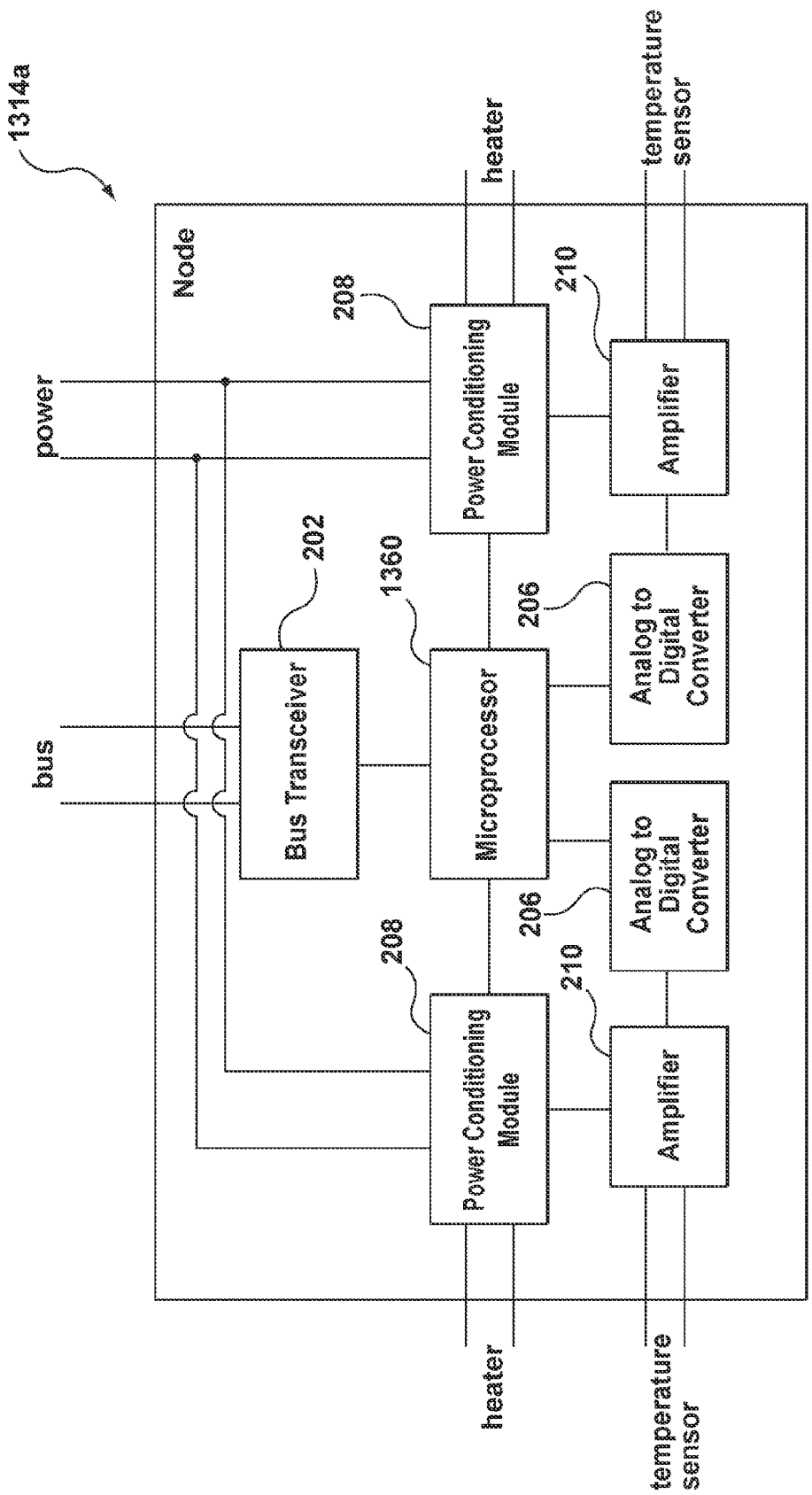
FIG. 13b is a block diagram of a node the can control more than one nozzle according to an embodiment of the invention.

FIG. 13b is a block diagram of a node 1314a that can control more than one nozzle according to an embodiment of the invention. The node 1314a can be used as shown in FIG. 13a. The node 1314a includes a bus transceiver 202 for connecting to bus lines and a microprocessor 1360 connected to the bus transceiver 202. The node 1314a further includes, for each connected nozzle, a power conditioning module 208, an amplifier 210, and an analog-to-digital converter 206. The main difference between the node 1314a and the node 200 of FIG. 2 is that the microprocessor 1360 should be programmed to manage temperature and heater signals for two different nozzles. Such management means independent measurement and control for the two nozzles. Of course, more than two nozzles can be used with one node, such a node simply needing an additional power conditioning module, analog-to-digital converter, and amplifier for each additional nozzle.

Heaters and temperature sensors are examples of electrical devices that can be controlled or monitored by the bus and nodes described herein. Other examples of electrical devices include hydraulic, pneumatic, and electrical actuators; pressure sensors; and strain gauges. In fact, any electrical device used in a mold, be it a sensor, an actuator, or both, can be used.

Figure 14:
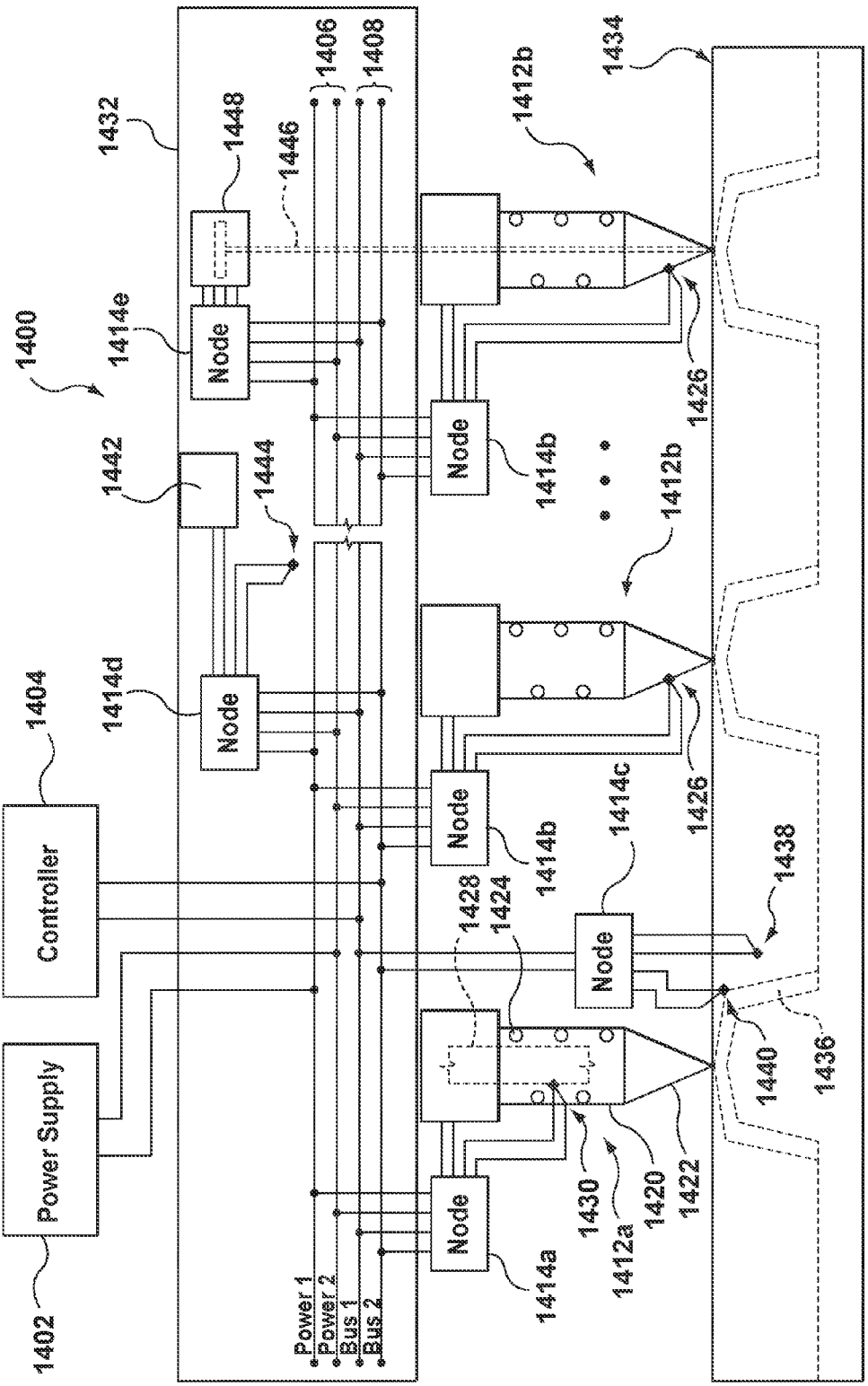
FIG. 14 is a schematic diagram of a bus connecting nozzles and other devices to a controller according to another embodiment of the invention.

With regard to the different electrical devices that can be used, FIG. 14 shows a schematic diagram of components of an injection molding system 1400 according to another embodiment of the invention. The system 1400 includes a power supply 1402, a controller 1404, power lines 1406, bus lines 1408, nozzles 1412, and nodes 1414. Further shown are a mold plate 1432 and cavity plates 1434 defining cavities 1436. The power lines 1406, bus lines 1408, and many of the nodes 1414 are installed within in the mold plate 1432. FIG. 14 is simplified to ease understanding of the invention. Not shown are an injection molding machine, additional hot-half and cold-half plates, a manifold, actuators, melt channels, cooling channels, heaters, and other well-known features and components. The manifold plate 1400 and the nozzles 1412 are usually known as a hot runner or hot runner device.

The power supply 1402 provides electrical power to the system 1400. In this embodiment, the power supply 1402 provides 220 VAC. In other embodiments, the power supply can provide other levels of AC or DC power (e.g., 24 VDC). Electrical power in the system 1400 is transmitted by power lines 1406 and the lines that connect the power supply 1402 and nodes 1414 to the power lines 1406.

The controller 1404 can be a computer or a processing circuit designed to control the system 1400. In this embodiment, the controller 1404 measures temperatures of the nozzles 1412 and controls the heaters accordingly. The controller 1404 further measures and controls other devices as will de discussed. Signals between the controller 1404 and the nodes 1414 are communicated over the bus lines 1408 and the lines that connect the controller 1404 and the nodes 1414 to bus lines 1408. The controller 1404 and the power supply 1402 can be part of the same device. The controller 1404 can be similar to that shown in FIG. 3.

Each nozzle 1412 includes a nozzle body 1420 and a nozzle tip 1422. Each nozzle 1412 also includes a heater 1424, such as a resistance wire heater element, which is connected by wires to the node 1414. The nozzle 1412*a* further includes a melt pressure sensor 1430 disposed in a melt channel 1428 of the nozzle 1412*a*. The melt pressure sensor 1430 measures melt pressure in the melt channel 1428 and sends a corresponding signal over a wire to the node 1414*a*. The nozzles 1412*b* include temperature sensors 1426, such as thermocouples. The temperature sensors 1426 are connected to the nodes 1414*b* by wires. Of course, any nozzle can have a temperature sensor or a melt pressure sensor or both.

The nodes 1414 generally serve to communicate power from the power lines 1406 to the connected electrical devices. The nodes 1414 also serve to communicate signals from the connected sensors to the controller 1404 via the bus lines 1408. Further, the nodes 1414 can receive control signals for the electrical devices from the controller 1404 via the bus lines 1408. The nodes 1414 are similar to the nodes shown in FIGS. 2 and 13*b*.

The node 1414*c* is connected to a pressure sensor 1440 disposed in the cavity 1436 and a temperature sensor 1438 disposed in one of the cavity plates 1434. The node 1414*c* measures pressure of the cavity and temperature near the cavity. The node 1414*c* is thus a sensor-only node and need not connect to the power lines 1406. In this regard, the node 1414*c* also need not have a power conditioning module.

The node 1414*d* is connected to a load cell 1442 and a strain gauge 1444, and thus measures a load on the mold plate 1432 and a strain in the mold plate 1432. The node 1414*d* may be similar to the nodes shown in FIGS. 2 and 13*b*.

The node 1414*e* is connected to an actuator 1448 that controls the position of a valve pin 1446 of the right-most nozzle 1412*b*. Depending on the type of actuator used (e.g., hydraulic, pneumatic, or electrical), power from the node 1414*e* controls hydraulic or pneumatic valves or a position/speed/torque of an electric motor. The node 1414*e* further measures an actuator position/speed via a corresponding sensor (not shown). If no position/speed sensor is required, this node would be an actuator-only node, and would thus not require an analog-to-digital converter and an amplifier. Of course, actuators are very versatile, and, for use with the invention, need not be restricted to moving valve pins.

The bus lines 1408 and power lines 1406 can be wires, a set of wires, or a printed circuit board having conductive traces.

By using the bus lines 1408 and power lines 1406, the overall wiring complexity is reduced. The nodes 1414 are provided because signals on the bus lines 1408 must be at least partially interpreted to determine to which device they apply. For this purpose and others, the nodes 1414 have logic that can monitor the bus lines 1408, take information off the bus lines 1408, and put information onto the bus lines 1408.

Of course, if a node is only a sensor node, such as nodes 1414*c* and 1414*d*, it need not have the hardware to take information off the bus lines 1408 since it does not control anything. Likewise, if a node is only an actuator node, it need not have the hardware to put information onto the bus lines 1408.

Figure 15:
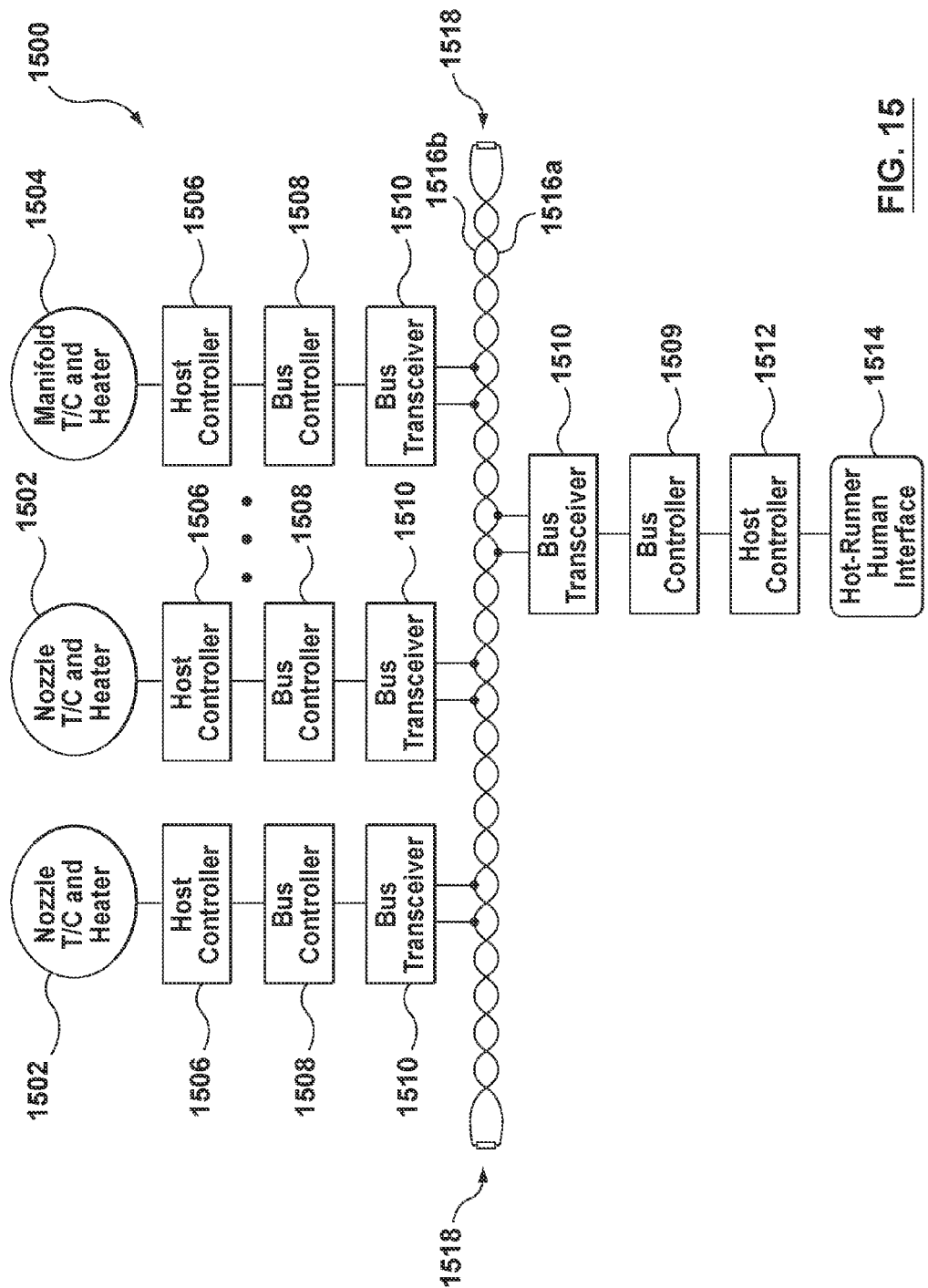
FIG. 15 is a schematic diagram of a CAN bus system for controlling a hot runner according to an embodiment of the invention.

FIG. 15 shows a schematic diagram of a CAN bus system 1500 for controlling a hot runner according to the invention. The system 1500 includes a plurality of nozzles 1502 having thermocouples and heaters and a manifold 1504 having a thermocouple and a heater. Connected to the nozzles 1502 and manifold 1504 are host controllers 1506 that control the heaters and measure sensor data. Connected to the host controllers 1506 are bus controllers 1508 that manage the heater and sensor signals. Connected to the bus controllers 1508 are bus transceivers 1510 that communicate data with bus lines 1516*a*, 1516*b*. Bus lines 1516*a*, 1516*b* are twisted pair and have 120-ohm terminators 1518 at each end. The nozzles 1502, manifold 1504, and related host controllers 1506, bus controllers 1508, and bus transceivers 1510 are located in a mold. Regarding the previous embodiments, the host controller 1506 and bus controller 1508 roughly correspond to the microprocessor 204, the analog-to-digital converter 206, the power conditioning module 208, and the amplifier 210 (see FIG. 2). The bus transceiver 1510 corresponds to the bus transceiver 202.

At the operator end of the system 1500, a hot-runner human interface 1514 is provided for operator control. The hot-runner human interface can include display devices and input devices. Connected to the hot-runner human interface 1514 is a host controller 1512 that provides the functionality of the hot-runner human interface (e.g., nozzle/manifold temperature control). Connected to the host controller 1512 is a bus controller 1509, which manages data to be communicated with the nozzles and manifolds. Connected to the bus controller 1509 is a bus transceiver 1510 that communicates data with bus lines 1516*a*, 1516*b*. Regarding the previous embodiments, the host controller 1512 and bus controller 1509 roughly correspond to the microprocessor 304 (see FIG. 2). The bus transceiver 1510 corresponds to the bus transceiver 302.

Using the system 1500, the amount and complexity of wiring used in the hot runner can be reduced. Only two bus lines for all the nozzles and the manifold are required for sensor data and control, where before separate wires needed to be provided to each nozzle and the manifold.

Of course, one advantage of the invention is reduced wiring, in that the prior art needed separate power and sensor wires from a controller to each nozzle, manifold, or other mold component, while the busses described above allow sharing wires and therefore reducing wiring path sizes, which can mean a consistently sized bus channels within a mold plate. Another advantage is that digital data is less susceptible to interference and more conducive to error checking and correction than is analog data.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An injection molding system comprising:
   a mold having a hot half and a cold half, the hot half having a hot runner;
   a first bus transceiver located in the mold;
   an electrical device located in the mold and electrically coupled to the first bus transceiver, the electrical device associated with operation of the mold;
   a controller located outside the mold for controlling the mold, the controller including a second bus transceiver; and
   a bus line electrically coupling the controller to the first bus transceiver of the electrical device.

2. The injection molding system of claim 1 comprising a plurality of electrical devices coupled to a plurality of first bus transceivers, the bus line electrically coupling the controller to the plurality of first bus transceivers.

3. The injection molding system of claim 1 comprising more than one bus line.

4. The injection molding system of claim 1, wherein the electrical device comprises a sensor.

5. The injection molding system of claim 4, wherein the sensor is selected from a group consisting of a temperature sensor, a pressure sensor, a strain gauge, and a load cell.

6. The injection molding system of claim 4, wherein the sensor is disposed in a manifold plate, a nozzle, or a mold or cavity plate.

7. The injection molding system of claim 1, wherein the electrical device comprises a heater.

8. The injection molding system of claim 7, wherein the heater is disposed in a manifold or nozzle.

9. The injection molding system of claim 1, wherein the electrical device comprises an actuator.

10. The injection molding system of claim 1 further comprising power lines and a power supply, the power lines connecting the electrical device to the power supply.

11. The injection molding system of claim 1 further comprising a power supply, wherein the bus line is a power line that connects the electrical device to the power supply.

12. The injection molding system of claim 1 further comprising another electrical device located in the mold and electrically coupled to the first bus transceiver, the other electrical device associated with operation of the mold.

13. The injection molding system of claim 1 further comprising a mold plate having an electrical conduit in which the bus line is located.

14. The injection molding system of claim 1 wherein the second bus transceiver is contained in a junction box attached to the outside of the hot half.

15. The injection molding system of claim 1 further comprising a repeater connected to the bus line.

16. The injection molding system of claim 1 further comprising a node that includes the first bus transceiver.

17. The injection molding system of claim 16, wherein the node further comprises a microprocessor connected to the first bus transceiver.

18. The injection molding system of claim 17, wherein the node further comprises a power conditioning module connected to the microprocessor and connected between power lines and the electrical device.

19. The injection molding system of claim 17, wherein the node further comprises an analog-to-digital converter connected to the microprocessor and an amplifier connected between the analog-to-digital converter and the electrical device.

20. The injection molding system of claim 16, wherein the node includes a housing which encloses an integrated-circuit chip that includes the first bus transceiver.

21. The injection molding system of claim 20, wherein the housing is made of a thermally robust material.

22. The injection molding system of claim 1, wherein the controller is master of the bus line.

23. The injection molding system of claim 1, wherein the controller, bus line, and first bus transceiver form a multi-master bus system having priority arbitration.

24. An injection molding system comprising:
   a hot half including a manifold, nozzles, heaters, and temperature sensors;
   a plurality of nodes located inside the hot half adjacent the nozzles, the nodes including node bus transceivers connected to the heaters and temperature sensors;
   a controller including a controller for controlling the hot half bus transceiver, the controller and controller bus transceiver located outside of the hot half; and
   a bus line connecting the node bus transceivers to the controller bus transceiver.

25. The injection molding system of claim 24 comprising more than one bus line.

26. The injection molding system of claim 24 further comprising a power supply and power lines connecting the power supply to the nodes.

27. The injection molding system of claim 24 further comprising a mold plate having an electrical conduit in which the bus line is located.

28. The injection molding system of claim 24 wherein the controller bus transceiver is contained in a junction box attached to the outside of the hot half.

29. The injection molding system of claim 24, wherein the controller, bus line, and nodes form a multi-master bus system having priority arbitration.

30. The injection molding system of claim 24, wherein each of the plurality of nodes is associated with one of the nozzles.

* * * * *